United States Patent
Sano

(10) Patent No.: US 8,563,660 B2
(45) Date of Patent: Oct. 22, 2013

(54) FLUORORUBBER-BASED SEALING MATERIAL HAVING GOOD SEALING PROPERTIES UNDER HIGH/LOW TEMPERATURE LOAD

(75) Inventor: Hiroyuki Sano, Fujisawa (JP)

(73) Assignee: Nok Corporation, Tokyo (JP)

( * ) Notice: Subject to any disclaimer, the term of this patent is extended or adjusted under 35 U.S.C. 154(b) by 275 days.

(21) Appl. No.: 12/937,371

(22) PCT Filed: Apr. 7, 2009

(86) PCT No.: PCT/JP2009/057095
§ 371 (c)(1),
(2), (4) Date: Oct. 11, 2010

(87) PCT Pub. No.: WO2009/128363
PCT Pub. Date: Oct. 22, 2009

(65) Prior Publication Data
US 2011/0034639 A1    Feb. 10, 2011

(30) Foreign Application Priority Data

Apr. 14, 2008   (JP) ................................. 2008-104810

(51) Int. Cl.
*C08F 114/22*   (2006.01)

(52) U.S. Cl.
USPC ........... 525/387; 525/199; 525/326.2; 521/28

(58) Field of Classification Search
USPC .................... 525/387, 199, 326.2; 521/28
See application file for complete search history.

(56) References Cited

U.S. PATENT DOCUMENTS

| | | | |
|---|---|---|---|
| 7,514,512 B2 | 4/2009 | Apostolo et al. | |
| 2002/0028886 A1 | 3/2002 | Abe et al. | |
| 2009/0264684 A1 | 10/2009 | Apostolo et al. | |

FOREIGN PATENT DOCUMENTS

| | | | |
|---|---|---|---|
| EP | 2267072 A1 | * | 12/2010 |
| JP | 2002-037818 | * | 2/2002 |
| JP | 2004-217892 | * | 8/2004 |
| JP | 2004-217892 A | * | 8/2004 |
| JP | 2006-045566 | | 2/2006 |
| JP | 2006-274063 | * | 10/2006 |
| JP | 2006-274063 A | | 10/2006 |
| WO | WO-2007-111334 A | * | 10/2007 |
| WO | WO-2007/111334 A1 | | 10/2007 |
| WO | WO-2009/128363 A1 | * | 10/2009 |

OTHER PUBLICATIONS

International Search Report in PCT/JP2009/057095 dated Jul. 14, 2009.

* cited by examiner

*Primary Examiner* — Peter D. Mulcahy
*Assistant Examiner* — Henry Hu
(74) *Attorney, Agent, or Firm* — Foley & Lardner LLP

(57) ABSTRACT

[Object] To provide a fluororubber-based sealing material which is excellent in sealing properties under high/low temperature load and is capable of sealing at a temperature of not higher than −40° C. even when gas oil (diesel fuel) is used.
[Means for Solving] A fluororubber-based sealing material obtained by crosslinking a composition for a fluororubber-based sealing material, said composition comprising 100 parts by weight of a fluorine-containing copolymer which contains 64 to 69% by weight of fluorine, has a crosslinking site derived from a bromine-containing compound and/or an iodine-containing compound and is capable of being crosslinked by a peroxide, 0.5 to 6 parts by weight of an organic peroxide and 1 to 10 parts by weight of a polyfunctional monomer, wherein the fluorine-containing copolymer in the composition for a fluororubber-based sealing material is a fluororubber polymer obtained by copolymerizing (a) VDF, (b) TFE, (c) FMVE, (d) FMMVE and (e) brominated/iodinated unsaturated fluorohydrocarbon.

6 Claims, 1 Drawing Sheet

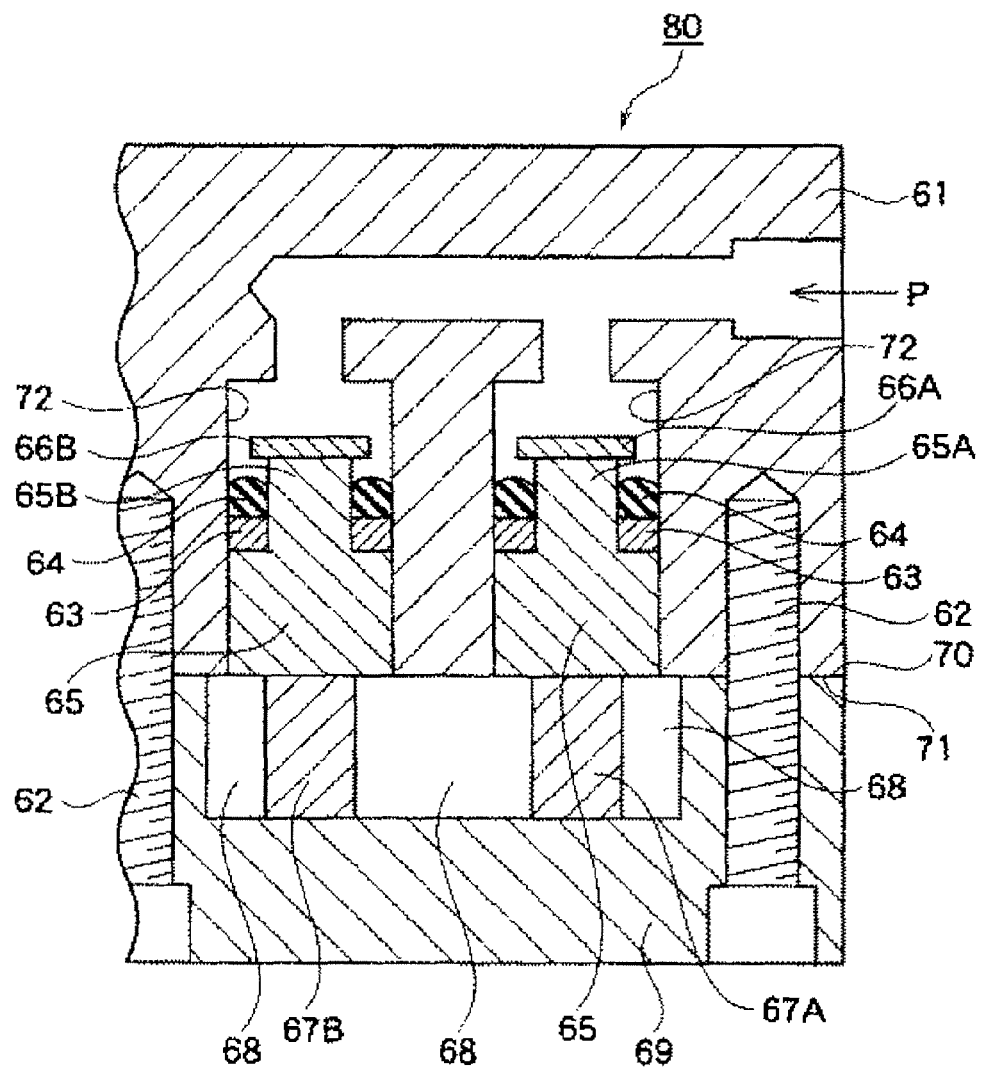

FLUORORUBBER-BASED SEALING MATERIAL HAVING GOOD SEALING PROPERTIES UNDER HIGH/LOW TEMPERATURE LOAD

TECHNICAL FIELD

The present invention relates to a fluororubber-based sealing material. More particularly, the present invention relates to a fluororubber-based sealing material which is suitable for a sealing part of an automobile fuel tank, etc. and is excellent in compression set under high/low temperature load.

BACKGROUND ART

For sealing materials used for sealing of portions to be brought into contact with automobile fuels, such as a fuel tank, "fuel oil resistance" to perfectly prevent leak of a fuel oil from a fuel tank or the like is required, and for such materials, a fluororubber has been mainly used.

There is a recent tendency to requirement for globalization (worldwide common specifications) of automobile supply, and in the winter cold district, such as North America, fuel oil resistance, specifically sealing properties at not higher than −40° C., are required. Moreover, from the environmental problem, adoption of diesel fuel has spread mainly in Europe.

To meet these requirements, the present applicant has proposed a fluororubber composition capable of sealing even at not higher than −40° C., and has also proposed a sealing material using the fluororubber composition (patent literature 1).

In recent years, however, even in the sealing parts using the material disclosed in the patent literature 1, there is yet room for further improvement in the sealing properties depending upon the use conditions and the like. Specifically, when the fuel is changed to gas oil (diesel fuel) from the conventional pseudo-gasoline or gasoline, leak occurs in the engine evaluation depending upon the use conditions.

More specifically, the above leak occurs in the thermal load test in which use of the above fuel in automobiles in the extremely low-temperature district is supposed. The thermal load test is a test in which a sealing material is mounted at the position for use, then temporarily allowed to stand at a high temperature, specifically about 120° C., and thereafter sufficiently cooled down to a temperature at which the sealing evaluation is intended to be carried out, followed by evaluation of sealing properties.

In the above test, TR-10 has been used as a substitute indicator in the past, but when gas oil is used as a fuel, this indicator has proved to be inapplicable.

CITATION LIST

Patent Documents

Patent document 1: JP-A-2004-217892

SUMMARY OF INVENTION

Subject to be Solved in the Present Invention

The present invention has been made in view of the above problems, and it is an object of the present invention to provide a fluororubber-based sealing material which is excellent in sealing properties under high/low temperature load and is capable of sealing at not higher than −40° C. even when gas oil (diesel fuel) is used.

Means for Solving the Subject

The present inventors have carried out search for an evaluation method that newly becomes a substitute indicator.

Specifically, not the conventional method to measure TR-10 or low-temperature compression set but a method close to actual evaluation has been adopted. In this method, an O-ring is compressed in a given compression ratio, then temporarily allowed to stand at a high temperature, specifically 120 to 150° C., for a given period of time and thereafter quenched rapidly to a temperature at which sealing properties are required. Next, after the temperature of the O-ring becomes sufficiently low, the compression is released at a low temperature, and at this time, measurement of a compression set is carried out.

As a result, it has become clear that when the value of the compression set at a low temperature becomes not less than 80% that has been hitherto regarded as a limit of sealing at a high temperature, sealing becomes impossible. That is to say, it has been found that a compression set ratio of less than 80% is needed as sealing properties.

Moreover, it has been also found that a compression set of not more than 80% at −40° C. in the above evaluation method cannot be attained by the fluororubber polymer invented in the patent literature 1, and in order to obtain such a compression set, a fluororubber polymer having a novel composition is necessary. Thus, the present invention has been achieved.

That is to say, the present invention is specified by the matters described below.

The present invention is a composition for a fluororubber-based sealing material, which comprises a fluorine-containing copolymer containing 64 to 69% by weight of fluorine, having a crosslinking site derived from a bromine-containing compound and/or an iodine-containing compound and capable of being crosslinked by a peroxide, an organic peroxide in an amount of 0.5 to 6 parts by weight based on 100 parts by weight of the fluorine-containing copolymer, and a polyfunctional monomer in an amount of 1 to 10 parts by weight based on 100 parts by weight of the fluorine-containing copolymer. The present invention is also a fluororubber-based sealing material obtained by curing the composition. The fluorine-containing copolymer in the composition for a fluororubber-based sealing material is a fluororubber polymer obtained by copolymerizing the following components (a) to (e): (a) vinylidene fluoride (VDF) in an amount of 30 to 70% by mol, (b) tetrafluoroethylene (TFE) in an amount of 10 to 30% by mol, (c) perfluoro(methyl vinyl ether) (FMVE) in an amount of 10 to 20% by mol, (d) perfluoro(methoxymethyl vinyl ether) (FMMVE) in an amount of 5 to 30% by mol, and (e) brominated and/or iodinated unsaturated fluorohydrocarbon in a small amount based on 100% by mol of the total amount ((a)+(b)+(c)+(d)) of the component (a) to the component (d).

The fluororubber-based sealing material of the present invention preferably has TR-10, as determined in the low-temperature elastic recovery test (TR test) defined by JIS K6261 corresponding to ASTM D1329, of −42 to −35° C., and preferably has a compression set under high/low temperature load of less than 80%.

The composition for a fluororubber-based sealing material of the present invention is preferably a composition for forming a sealing material which is used in a portion of a container for containing at least one substance selected from the group consisting of oils, such as a fuel oil, a lubricating oil and a hydraulic oil, aromatic hydrocarbons, aliphatic hydrocarbons, alcohol mixed oils, alcohols, and gases thereof, said portion being brought into contact with these contents.

On the other hand, the fluororubber-based sealing material of the present invention is preferably used in a portion of a fuel tank, a fuel injector (fuel injection device), a fuel pump or a fuel pipe of an automobile, said portion being brought into contact with a fuel selected from oils, such as a fuel oil, a lubricating oil and a hydraulic oil, aromatic hydrocarbons, aliphatic hydrocarbons, alcohol mixed oils, and alcohols, or a gas of the fuel.

The change in volume of the fluororubber-based sealing material of the present invention after the fluororubber-based sealing material is immersed in a fuel at room temperature of 20 to 25° C. for 168 hours is preferably not more than 20%.

The fuel may be at least one fuel selected from the group consisting of gasoline, liquefied petroleum gas (LPG), compressed natural gas (CNG), gas oil, ethanol, bioethanol and methanol.

Effect of the Invention

The present invention can provide a fluororubber-based sealing material which has properties in ordinary state, compression set, low-temperature properties (TR-10), fuel oil resistance (change in volume) and low-temperature sealing properties (employable at −42° C.) all of which are equivalent to those of conventional sealing materials, is superior to the conventional sealing materials in compression set under high/low temperature load, and consequently exhibits excellent sealing properties under high/low temperature load even when it is used as an O-ring or the like that is a product.

BRIEF DESCRIPTION OF THE DRAWING

FIG. 1 is an explanatory view of a low-temperature sealing test in which a fluororubber-based sealing material against an automobile fuel according to an example of the present invention is used as an O-ring for an injector.

PREFERRED EMBODIMENT FOR CARRYING OUT THE INVENTION

The composition for a fluororubber-based sealing material and the fluororubber-based sealing material according to the present invention are described in detail hereinafter.

<Composition for Fluororubber-Based Sealing Material>

The composition for a fluororubber-based sealing material according to the present invention comprises a fluororubber polymer, an organic peroxide and a polyfunctional monomer which are described below in detail.

In a preferred embodiment of the present invention, a metal compound (corrosion inhibitor, acid accepter), a bituminous fine powder, a flat filler and the like may be further contained in this composition for a sealing material.

<Fluororubber Polymer>

The fluororubber polymer for use in the present invention has a fluorine content, as determined by the $F^{19}$ NMR method (measuring and calculation method), of 64 to 69% by weight, preferably 64 to 66% by weight, and has a crosslinking site derived from a bromine-containing compound and/or an iodine-containing compound.

Such a fluororubber polymer (fluorine-containing copolymer) has, in the copolymer, (a) a component unit derived from vinylidene fluoride (VDF, vinylidene fluoride) (which is also referred to as a "VDF component unit" or a "component unit" simply hereinafter, the same shall apply to other components), (b) a component unit derived from tetrafluoroethylene (TFE, ethylene tetrafluoride), (c) a component unit derived from perfluoro(methyl vinyl ether) (FMVE), (d) a component unit derived from perfluoro(methoxymethyl vinyl ether) (FMMVE), and (e) a component unit derived from brominated and/or iodinated unsaturated fluorohydrocarbon, as a unit for a crosslinking site.

Such a crosslinking fluororubber polymer (fluorine-containing copolymer) is a fluororubber polymer prepared by copolymerizing:

(a) vinylidene fluoride (VDF, vinylidene fluoride) in an amount of 30 to 70% by mol, preferably 40 to 65% by mol, more preferably 50 to 64% by mol, (b) tetrafluoroethylene (TFE, ethylene tetrafluoride) in an amount of 10 to 30% by mol, preferably 12 to 28% by mol, more preferably 15 to 25% by mol, (c) perfluoro(methyl vinyl ether) (FMVE) in an amount of 10 to 20% by mol, preferably 5 to 15% by mol, more preferably 5 to 10% by mol, (d) perfluoro(methoxymethyl vinyl ether) (FMMVE) in an amount of 5 to 30% by mol, preferably 8 to 25% by mol, more preferably 10 to 20% by mol, and (e) a brominated and/or iodinated unsaturated fluorohydrocarbon monomer, as a monomer for a crosslinking site, in a small amount, for example, in an amount of 0.01 to 3% by mol based on 100% by mol of the total amount of the above monomers (a) to (d).

Also in the fluorine-containing copolymer, the component units are contained and present in the same molar ratios as those of the raw material monomers used.

When the fluorine content in the composition for a fluororubber-based sealing material for use in the formation of a fluororubber or in the fluororubber polymer is in the above range, the resulting fluororubber-based sealing material tends to become good in balance between the low-temperature resistance and the fuel oil resistance. If the fluorine content in the composition for a fluororubber-based sealing material or in the fluororubber polymer is less than the lower limit of the above range, the fuel oil resistance of the resulting fluororubber-based sealing material tends to be deteriorated though the low-temperature resistance thereof becomes good. If the fluorine content exceeds the upper limit of the above range, the low-temperature resistance of the resulting fluororubber-based sealing material tends to be deteriorated though the fuel oil resistance thereof becomes good. When the component units in the fluorine-containing copolymer are used in the above amounts, the resulting fluororubber-based sealing material exhibits rubber-like flexibility and tends to have sufficiently excellent low-temperature resistance and fuel oil resistance with a good balance, and the fluororubber-based sealing material can be favorably used particularly as a fluororubber-based sealing material against an automobile fuel.

In particular, if the VDF component unit content in the composition for a fluororubber-based sealing material for use in the formation of a fluororubber or in the fluororubber polymer is less than the lower limit of the above range, both of the low-temperature resistance and the fuel oil resistance of the resulting fluororubber-based sealing material tend to be deteriorated. If the VDF component unit content exceeds the upper limit of the above range, mechanical strength of the resulting fluororubber-based sealing material tends to be deteriorated. If the TFE component unit content exceeds the upper limit of the above range, fuel oil resistance of the resulting fluororubber-based sealing material tends to be deteriorated, and if the TFE component unit content is less than the lower limit of the above range, low-temperature resistance thereof tends to be deteriorated.

If the FMVE component unit content in the composition for a fluororubber-based sealing material for use in the formation of a fluororubber-based sealing material or in the fluororubber polymer exceeds the upper limit of the above range, low-temperature resistance of the resulting fluororubber-based sealing material tends to be deteriorated, and if the EMVE component unit content is less than the lower limit of the above range, fuel oil resistance thereof tends to be deteriorated. If the EMMVE component unit content exceeds particularly the upper limit of the above range, low-temperature resistance of the resulting fluororubber-based sealing material tends to be deteriorated.

When the brominated and/or iodinated unsaturated fluorohydrocarbon component unit is used in the above amount as a unit for a crosslinking site, a moderate degree of crosslinking is obtained by crosslinking the unit, and the resulting fluororubber (vulcanized and cured product) tends to have sufficiently excellent low-temperature resistance and fuel oil resistance with a good balance.

Examples of monomers for forming the brominated and/or iodinated unsaturated fluorohydrocarbon unit include 1-bromo-2-iodo-perfluoroethane and 1-bromo-3-iodo-perfluoropropane.

It is thought that in the fluororubber polymer, each monomer used undergoes cleavage of a double bond at the carbon-carbon double bond site and becomes a monomer unit (also referred to as a "polymerization unit", a "component unit" or the like) of a single bond, and the monomer unit and its adjacent monomer unit are bonded (connected) to each other. In the resulting fluororubber polymer, fluorine-containing component units derived from the fluorine-containing monomers used are arranged at random or regularly, and the fluororubber polymer is solid or liquid. Although the molecular weight of the fluororubber polymer can be properly determined taking into account molding processability, various mechanical properties, etc. of the fluorine-containing copolymer, the intrinsic viscosity [η] (measuring method: determined from a drop time measured at 35° C. by Ubbelohde viscometer) that is an indicator of a molecular weight is desired to be in the range of usually 0.2 to 5.0 dl/g, preferably 0.4 to 3.0 dl/g, from the viewpoint of molding processability.

Such a fluororubber polymer is prepared in accordance with a conventional process. Specifically, a preparation process disclosed in JP-A-2006-45566 can be used.

Such a fluororubber polymer (also referred to as an"unvulcanized rubber", an "uncrosslinked fluorine-containing copolymer" or the like) desirably has a Mooney viscosity (in accordance with JIS K6300-1 corresponding to ASTM D1646, $ML_{1+10}$, 121° C.) of 10 to 120, preferably 20 to 80, from the viewpoint of rubber processing, but the Mooney viscosity is not specifically restricted.

<Organic Peroxide>

As the organic peroxide, an organic peroxide generally employable for rubbers can be used without any restriction, and the organic peroxide is used in an amount of usually 0.5 to 6 parts by weight, preferably 1 to 5 parts by weight, based on 100 parts by weight of the fluororubber polymer (FKM).

If the amount of the organic peroxide blended is particularly less than 0.5 part by weight, sufficient crosslink density is not obtained. If the amount thereof exceeds particularly 6 parts by weight, a crosslinked molded product is not obtained because of foaming, and even if it is obtained, rubber elasticity and elongation tend to be lowered.

Examples of the organic peroxides include tert-butyl peroxide, dicumyl peroxide, tert-butyl cumyl peroxide, 1,1-di(tert-butylperoxy)-3,3,5-trimethylcyclohexane, 2,5-dimethyl-2,5-di(tert-butylperoxy)hexane, 2,5-dimethyl-2,5-di(tert-butylperoxy) hexyne-3, 1,3-di(tert-butylperoxyisopropyl)benzene, 2,5-dimethyl-2,5-di(benzoylperoxy)hexane, tert-butyl peroxybenzoate, tert-butyl peroxyisopropyl carbonate and n-butyl-4,4-di(tert-butylperoxy)valerate. Furthermore, commercially available organic peroxides are also employable, and specifically, "Perhexa 25B40" (available from Nippon Oil & Fats Co., Ltd.) can be mentioned.

These organic peroxides may be used singly or in combination or two or more kinds.

<Polyfunctional Monomer>

As the polyfunctional monomer, a polyfunctional monomer generally employable for rubbers can be used without any restriction, and the polyfunctional monomer is used in an amount of usually 1 to 10 parts by weight, preferably 2 to 8 parts by weight, based on 100 parts by weight of the fluororubber polymer (FKM).

If the amount of the polyfunctional monomer blended is particularly less than 1 part by weight based on 100 parts by weight of the fluororubber polymer (FKM), sufficient crosslink density is not obtained. Even if the polyfunctional monomer is used in an amount exceeding particularly 10 parts by weight, a crosslinked molded product is not obtained because of foaming, and even if it is obtained, elasticity and elongation tend to be lowered.

Examples of the polyfunctional monomers include triallyl isocyanurate, triallyl cyanurate, triallyl trimellitate, trimethylolpropane trimethacrylate and N,N'-m-phenylenebismaleimide.

These polyfunctional monomers may be uses singly or in combination of two or more kinds.

<Metal Compound>

The metal compound functions as a corrosion inhibitor and an acid acceptor, and examples of the metal compounds include calcium hydroxide, zinc oxide, hydrotalcite and magnesium oxide. In the present invention, these metal compounds may be used singly or in combination of two or more kinds.

Such a metal compound exhibits, for example, an effect of inhibiting corrosion of a metallic material that is in contact with the rubber-based sealing material, and taking various functions and effects into account, the metal compound is used in an amount of usually not less than 2 parts by weight, preferably 5 to 15 parts by weight, based on 100 parts by weight of the (uncrosslinked) fluororubber capable of being crosslinked by a peroxide.

Examples of commercial products of such metal compounds include "Caldic" (calcium hydroxide) available from Ohmi Chemical Industry Co., Ltd., zinc white (zinc oxide) available from Sakai Chemical Industry Co., Ltd., and "DHT Series" (hydrotalcite) available from Kyowa Chemical Industry Co., Ltd.

<Bituminous Fine Powder>

As the bituminous fine powder, a bituminous fine powder obtained by pulverizing coal into a fine powder having an average particle diameter of not more than 10 μm (usually 1 to 10 μm), preferably 3 to 8 μm, can be used. When the bituminous fine powder is used if necessary, it is used in an amount of usually 2 to 40 parts by weight, preferably 5 to 30 parts by weight, based on 100 parts by weight of the fluororubber polymer (FKM). If the average particle diameter of the bituminous fine powder exceeds the upper limit of the above range, particularly 10 μm, strength at break (TB) and elongation at break (EB) of the rubber are low, and reinforcing properties on the level of practical use are not observed.

If the amount of the bituminous fine powder added is particularly less than 2 parts by weight based on 100 parts by weight of the fluororubber polymer (FKM), an addition effect, that is, an effect that addition of the bituminous fine powder improves heat resistance of the sealing material to thereby enable lengthening of life, is poor. On the other hand, if the bituminous fine powder is added in an amount exceeding particularly 40 parts by weight, viscosity of the resulting blend (composition) becomes so high that kneading and molding tend to be hindered.

An example of a commercially available bituminous fine powder is "Mineral Black 325BA" (from Keystone Filler & Mfg., average particle diameter: 6 μm).

<Flat Filler>

The flat filler is present in the fluororubber-based sealing material against an automobile fuel and contributes to improvement in fuel shutoff properties of the sealing material to thereby enable further suppression of evaporation of fuel.

Examples of the flat fillers include clay, mica, graphite and molybdenum disulfide, and these flat fillers are used singly or in combination of two or more kinds.

As such a flat filler, a flat filler having an average particle diameter of 0.5 to 50 μm, preferably 5 to 30 μm, and an aspect ratio of not less than 3, preferably 5 to 30, is used. If a flat filler having an average particle diameter or an aspect ratio of less than 3 is used, improvement in fuel shutoff properties is not obtained. On the other hand, if a flat filler having an average particle diameter of not less than 30 is used, reinforcing properties on the level of practical use are not obtained (specifically, strength at break or elongation at break of the rubber is low).

Such a flat filler is used in an amount of usually 2 to 40 parts by weight, preferably 5 to 30 parts by weight, based on 100 parts by weight of the fluororubber (FKM), when needed. If the amount of the flat filler added is particularly less than 2 parts by weight, improvement in fuel shutoff properties, which is an addition effect, is not obtained. If the flat filler is added in an amount exceeding particularly 40 parts by weight, viscosity of the resulting composition for forming a sealing material is increased, and kneading tends to become impossible. Moreover, a vulcanized sealing material tends to become extremely hard.

<Other Compounding Ingredients>

To the rubber composition, compounding agents which are generally used in the rubber industry, e.g., reinforcing agents, such as carbon black and white carbon, fillers other than the flat filler having the above shape (average particle diameter, aspect ratio), such as talc, clay, graphite and calcium silicate, processing aids, such as stearic acid, palmitic acid and paraffin wax, anti-aging agents, and plasticizers, are properly added as rubber compounding ingredients, when needed. Of these, carbon black is preferable, and the carbon black may be a commercial available one. Specifically, "Thermal Carbon Black N990 (MT carbon)" (available from Engineered Carbons Inc., U.S.A.) can be mentioned.

In order to obtain a crosslinking fluorine-containing copolymer composition having such compounding formulation, the above components are blended, and if necessary, the resulting blend is subjected to stirring, kneading and the like under such temperature and pressure conditions that the composition is not vulcanized (crosslinked), such as ordinary temperature and normal pressure. In the stirring and kneading, a kneading machine, such as an intermix, a kneader or a Bunbury mixer, an open roll, or the like can be used.

<Crosslinking (Vulcanization)>

In order to prepare the fluororubber-based sealing material (also referred to as a "sealing material" simply) which is a crosslinked (vulcanized) molded product and is preferably and typically used as a fluororubber-based sealing material that is used for sealing a portion that comes into contact with an automobile fuel, a general rubber molding method, such as compression molding, transfer molding, injection molding, extrusion method and calendaring, can be properly used.

For example, the composition for a fluororubber-based sealing material is subjected to heating (primary vulcanization) usually at 150 to 200° C. for about 3 to 60 minutes using an injection molding machine, a compression molding machine, a vulcanization press or the like. If necessary, the resulting product may be further subjected to heating (secondary vulcanization) usually at about 150 to 250° C. for about 1 to 24 hours using a heating oven or the like. The above vulcanization may be carried out under pressure or may be carried out by introducing the composition into a given mold, when needed.

It is thought that in such crosslinking reaction, bromine or iodine is eliminated from the crosslinking fluorine-containing copolymer by virtue of the organic peroxide, and at the eliminated portion, the polyfunctional monomer undergoes reaction and bonding to form a crosslinked structure.

When the composition for a fluororubber-based sealing material is molded into a sheet having a thickness of 2 mm, such a crosslinked molded product desirably has the following properties (a) to (c) in ordinary state.

(a) The Hs hardness of a durometer hardness (test type A) defined by JIS K6253 corresponding to ASTM D2240 is in the range of preferably 50 to 90, more preferably 60 to 80.

(b) The tensile stress defined by JIS K6251 corresponding to ASTM D412 is preferably not less than 10 MPa, more preferably not less than 12 MPa.

(c) The elongation at break is preferably not less than 100%, more preferably not less than 150%.

<Fluororubber-Based Sealing Material>

The fluororubber-based sealing material of the present invention is obtained by thermally compressing the above-mentioned composition for a fluororubber-based sealing material in a given mold at 160 to 180° C. for 10 to 20 minutes to crosslink and mold the composition and then further subjecting the resulting molded product to additional heat treatment in an air circulation type oven at 230° C. for 15 hours.

The sealing material obtained as above is a crosslinked molded product, and it has excellent fuel oil resistance and low-temperature resistance with a good balance and is excellent also in heat resistance. Therefore, as preferred examples of uses of the sealing material, there can be mentioned squeeze packings (e.g., O-ring, X-ring, D-ring, square ring) that are used in a portion of a fuel injector (fuel injection device, particularly electromagnetic valve type fuel injection device), a fuel pump, a fuel tank, a fuel pipe and the like, said portion being brought into contact with a fuel or a gas thereof, other packings (e.g., lip packings, such as U packing, V packing, L packing and J packing), diaphragm, lining, roll, oil seal, etc.

The targets of sealing are not limited to automobile fuels, and besides, oils, such as lubricating oil and hydraulic oil, aromatic hydrocarbons, aliphatic hydrocarbons, alcohols (e.g., methanol, ethanol), mixtures thereof (e.g., mixture of fuel oil C and alcohol in an arbitrary quantity ratio), etc. are also included.

The fluororubber-based sealing material desirably has the following properties (a) to (d).

(a) Compression Set

In the case where a compression set of the fluororubber-based sealing material in the form of a P-24 O-ring (about 23.7 mm (inner diameter)×3.5 mm (wire diameter)) is measured after the lapse of 70 hours at 175° C. in accordance with JIS K6262 corresponding to ASTM D395, the compression set is preferably not more than 30%, more preferably not more than 25%.

(b) Low-Temperature Elastic Recovery Test

In the low-temperature elastic recovery test (TR test) defined by JIS K6261 corresponding to ASTM D1329, TR-10 that is a criterion for evaluation of low-temperature resistance, namely cold resistance, is in the range of preferably −42 to −35° C., more preferably −42 to −40° C.

(c) Compression Set Under High/Low Temperature Load

A P-24 O-ring (about 23.7 mm (inner diameter)×3.5 mm (wire diameter)) is 25% compressed, allowed to stand at 120 to 150° C. for 10 to 20 hours and immediately cooled at −40° C. or −30° C. for 2 hours. Thereafter, the compression was released at the same temperature, and after the lapse of 30 minutes, a permanent set in fatigue is measured. In this case, the compression set under high/low temperature load at a cooling temperature of −30° C. is preferably less than 70%, and the compression set under high/low temperature load at a cooling temperature of −40° C. is preferably less than 80%.

(d) Fuel Oil Resistance Test

A swell of the sealing material after immersion in a fuel oil at 25° C. for 168 hours, which is a criterion for evaluation of fuel oil resistance and defined by JIS K6258 (immersion test method of vulcanized rubber) corresponding to ASTM D471, is preferably not more than 20%, more preferably not more than 15%. The fuel is desirably at least one fuel selected from the group consisting of gasoline, liquefied petroleum gas (LPG), compressed natural gas (CNG), gas oil, ethanol, bioethanol and methanol.

Moreover, in the case where the fluororubber-based sealing material is formed into a P-24 O-ring (about 23.7 mm (inner diameter)×3.5 mm (wire diameter)), then the O-ring is set in a sealing property test device shown in FIG. 1, and the O-ring is subjected to the following sealing performance tests (e) and (f), it is preferable that the O-ring does not leak.

In the following tests (e) and (f), nitrogen gas is used as a sealing target medium instead of a fuel oil such as gas oil, taking safety into account. It is thought that if sealing against nitrogen gas is possible, sealing against a fuel oil can be made sure.

Structure, action, etc. of the low-temperature sealing property test device shown in FIG. 1 are as follows.

An O-ring 64 and a backup ring 63 are set between a neck 65A and a head 66A and also between a neck 65B and a head 66B of a sealing target member 65 having a narrow and slender neck and a cylindrical trunk. In the setting, engine oil is applied to a surface of the O-ring 64, and the sealing target member is placed into a hole 72 of an upper structure part 61. Then, the sealing target member 65 is held by means of holding members 67A and 67B and a lower structure part 69 located under the holding members, and the lower structure part 69 and the upper structure part 61 are joined to each other with a bolt 62.

(e) Low-Temperature Sealing Test

In this state, the sealing target medium is filled between P and the O-ring 64. In the low-temperature sealing property measuring fixture 80 shown in FIG. 1 in which the backup ring 63 and the test O-ring 64 have been set, pressure is applied for 3 minutes under the following test conditions (temperature, pressure). Thereafter, the pressure is returned to normal pressure, and the O-ring, etc. are allowed to stand for 1 hour at the same temperature as in the test. Then, leak of the medium is confirmed by visual observation. If leak occurs during application of a given pressure to the sealing target medium from the outside, the medium leaks into a space 68 through the hole 72. In the setting of the O-ring 64, engine oil is applied to a surface of the specimen.

Test Conditions (a) Test O-ring: 7.5 mm (inner diameter)×5.5 mm (wire diameter)
(b) Temperature: −42° C.
(c) Pressure: 2.0 MPa
(d) Pressure medium: Fuel-C (fuel oil C)
(e) Compression ratio: 18%
(f) High/low temperature load sealing test In a low-temperature sealing property measuring fixture 80 shown in FIG. 1, a backup ring 63 and a test O-ring 64 are set, and they are allowed to stand at 120° C. for 70 hours and then allowed to stand at −40° C. for 2 hours. The temperature of the fixture 80 was returned to ordinary temperature, and after application of pressure for 3 minutes under the following test conditions (temperature, pressure), the O-ring, etc. are allowed to stand for 1 hour at the same temperature as in the test. Then, leak of the medium is confirmed by visual observation. If leak occurs during application of a given pressure to the sealing target medium from the outside, the medium leaks into a space 68 through the hole 72. In the setting of the O-ring 64, engine oil is applied to a surface of the specimen.

Test Conditions (a) Test O-ring: 7.5 mm (inner diameter)*5.5 mm (wire diameter)
(b) Temperature: −38° C., −40° C. and −42° C.
(c) Pressure: 2.0 MPa
(d) Pressure medium: Fuel-C (fuel oil C)
(e) Compression ratio: 18%

EXAMPLES

The present invention is further described with reference to the following examples, but it should be construed that the present invention is in no way limited to those examples. Material properties of cross linked molded products having various shapes obtained by curing a composition for a fluororubber-based sealing material and product properties of a product having a shape of a P-24 O-ring (about 23.7 mm (inner diameter)*3.5 mm (wire diameter)) were evaluated in the following manner.

<Material Property Evaluation>

(1) Properties in Ordinary State

As for a crosslinked molded product in the form of a 2 mm sheet, an Hs hardness (durometer hardness defined by JIS K6253 corresponding to ASTM 02240, test type A), and a tensile stress (MPa) and an elongation at break (%) defined by JIS K6251 corresponding to ASTM D412 were measured.

(2) Compression Set

As for a crosslinked molded product in the form of a P-24 O-ring (about 23.7 mm (inner diameter)*3.5 mm (wire diameter)), a compression set (%) after the lapse of 70 hours at 175° C. was measured in accordance with JIS K6262 corresponding to ASTM D395.

(3) Low-Temperature Elastic Recovery Test

As for a crosslinked molded product in the form of a P-24 O-ring (about 23.7 mm (inner diameter)*3.5 mm (wire diameter)), TR-10 (° C.) in the TR test defined by JIS K6261 corresponding to ASTM D1329 was measured.

(4) Compression Set Under High/Low Temperature Load

In accordance with JIS K6262 corresponding to ASTM D395, a crosslinked molded product in the form of a P-24 O-ring (about 23.7 mm (inner diameter)*3.5 mm (wire diameter)) was 25% compressed, allowed to stand at 120° C. for 15 hours and immediately cooled at −30° C. or −40° C. for 2 hours. Thereafter, the compression was released at the same temperature, and the crosslinked molded product was allowed to stand for 30 minutes. Then, the P-24 O-ring was measured, and a compression set (%) was calculated.

(5) Fuel Oil Resistance Test

In accordance with JIS K6258 (immersion test method of vulcanized rubber) corresponding to ASTM D471, a specimen was immersed in commercially available regular gasoline (A) or commercially available diesel fuel (gas oil) (B) at ordinary temperature (20 to 25° C.). After the lapse of 168 hours in this state, a volume of the specimen was measured, and a change in volume (96) was calculated.

<Product Evaluation>

An O-ring obtained in each of the following examples and comparative examples was set in a sealing property test device shown in FIG. 1, and the sealing performance was tested. As a sealing target medium, nitrogen gas was used instead of a fuel oil such as gas oil, taking safety into account. It is thought that if sealing against nitrogen gas is possible, sealing against a fuel oil can be made sure.

Structure, action, etc. of the low-temperature sealing property test device shown in FIG. 1 are as follows.

An O-ring 64 and a backup ring 63 were set between a neck 65A and a head 66A and also between a neck 65B and a head 66 of a sealing target member 65 having a narrow and slender neck and a cylindrical trunk. In the setting, engine oil was applied to a surface of the O-ring 64, and the sealing target member was placed into a hole 72 of an upper structure part 61. Then, the sealing target member 65 was held by means of holding members 67A and 67B and a lower structure part 69 located under the holding members, and the lower structure part 69 and the upper structure part 61 were joined to each other with a bolt 62.

(1) Low-Temperature Sealing Test

In this state, the sealing target medium was filled between P and the O-ring 64. In the low-temperature sealing property measuring fixture 80 shown in FIG. 1 in which the backup ring 63 and the test O-ring 64 had been set, pressure was applied for 3 minutes under the following test conditions (temperature, pressure). Thereafter, the pressure was returned to normal pressure, and the O-ring, etc. were allowed to stand for 1 hour at the same temperature as in the test. Thereafter, leak of the medium was confirmed by visual observation. If leak occurs during application of a given pressure to the sealing target medium from the outside, the medium leaks into a space 68 through the hole 72. In the setting of the O-ring 64, engine oil was applied to a surface of the specimen.

In the following Table 2, "AA" means "no leak", and the pressure in the table indicates a pressure (MPa) at which the fuel oil began to leak.

Test Conditions (a) Test O-ring: 7.5 mm (inner diameter)×5.5 mm (wire diameter)
(b) Temperature: −42° C.
(c) Pressure: 2.0 MPa
(d) Pressure medium: Fuel-C (fuel oil C)
(e) Compression ratio: 18%

(2) High/Low Temperature Load Sealing Test

In a low-temperature sealing property measuring fixture 80 shown in FIG. 1, a backup ring 63 and a test O-ring 64 were set, and they were allowed to stand at 120° C. for 70 hours and then allowed to stand at −40° C. for 2 hours. The temperature of the fixture was returned to ordinary temperature, and after application of pressure for 3 minutes under the following test conditions (temperature, pressure), the O-ring, etc. were allowed to stand for 1 hour at the same temperature as in the test. Thereafter, leak of the medium was confirmed by visual observation. If leak occurs during application of a given pressure to the sealing target medium from the outside, the medium leaks into a space 68 through the hole 72. In the setting of the O-ring 64, engine oil was applied to a surface of the specimen.

In the following Table 2, "AA" means "no leak", and the pressure in the table indicates a pressure (MPa) at which the fuel oil began to leak.

Test Conditions (a) Test O-ring: 7.5 mm (inner diameter)*5.5 mm (wire diameter)
(b) Temperature: −38° C., −40° C. and −42° C.
(c) Pressure: 2.0 MPa
(d) Pressure medium: Fuel-C (fuel oil C)
(e) Compression ratio: 18%

Example 1

As a fluororubber polymer, "FKM-1" having TR-10 of not higher than −35° C. and capable of being crosslinked by a peroxide was used.

The molar ratios of the raw materials fed in the preparation of "FKM-1" are as follows. That is to say, "FKM-1" was a fluorine-containing copolymer (uncrosslinked fluororubber) (Mooney viscosity ($ML_{1+4}$ 120° C. in accordance with JIS K6300-1 corresponding to ASTM D1646): 45) obtained by copolymerizing (a) vinylidene fluoride (VDF) in an amount of 31.4% by mol, (b) tetrafluoroethylene (TFE) in an amount of 27.3% by mol, (c) perfluoro(methyl vinyl ether) (FMVE) in an amount of 14.1% by mol, (d) perfluoro(methoxymethyl vinyl ether) (VMMVE) in an amount of 27.2% by mol, and as a component for a crosslinking site, (e) iodinated unsaturated fluorohydrocarbon in an amount of about 0.5% by mol.

In a kneader, 100 parts by weight of FKM-1, 10 parts by weight of carbon black ("Thermal Carbon Black N990 (MT carbon)" available from Engineered Carbons Inc., U.S.A.) as a filler, 3 parts by weight of "Perhexa 25B40" (available from Nippon Oil and Fats Co., Ltd.) as an organic peroxide and 3 parts by weight of triallyl isocyanurate ("Taic M60" available from Nippon Kasei Chemical Co., Ltd.) as a polyfunctional monomer were introduced and kneaded for 20 minutes, followed by milling with an open roll. Using a 2 mm sheet or a given mold having a shape of an O-ring, a crosslinked molded product was produced by thermal compression at 160 to 180° C. for 10 to 20 minutes. The resulting molded product was further subjected to additional heat treatment in an air circulation type oven at 230° C. for 15 hours.

Formulation of the composition for a fluororubber-based sealing material is set forth in Table 1.

Property values of the crosslinked molded product and the fluororubber-based sealing material are all set forth in Table 2.

Example 2

A crosslinked molded product and a fluororubber-based sealing material were prepared in the same manner as in Example 1, except that the amount of carbon black as a filler was changed to 40 parts by weight.

Formulation of the composition for a fluororubber-based sealing material is set forth in Table 1.

Property values of the crosslinked molded product and the fluororubber-based sealing material are all set forth in Table 2.

Comparative Example 1

A crosslinked molded product was prepared in the same manner as in Example 1, except that "LTFE6400X" available from Daionen Co., Ltd. was used as a fluorine-containing copolymer instead of FKM-1.

Formulation of the composition is set forth in Table 1.

The "LTFE6400X" had TR-10 of −40° C. and contained, as copolymer component units, a VDF unit, a TFE unit and a perfluoro (ethoxyethoxy methyl ether) unit.

Property values of the crosslinked molded product are all set forth in Table 2.

Comparative Example 2

A crosslinked molded product was prepared in the same manner as in Comparative Example 1, except that the amount of carbon black as a filler was changed to 45 parts by weight.

Formulation of the composition is set forth in Table 1.

Property values of the crosslinked molded product are all set forth in Table 2.

TABLE 1

|  |  | Ex. 1 | Ex. 2 | Comp. Ex. 1 | Comp. Ex. 2 |
|---|---|---|---|---|---|
| Fluorine-containing copolymer | Type | FKM-1 | FKM-1 | LTFE6400X | LTFE6400X |
|  | (Part(s) by weight) | 100 | 100 | 100 | 100 |
| Filler (part(s) by weight) |  | 10 | 40 | 15 | 45 |
| Organic peroxide (part(s) by weight) |  | 3 | 3 | 3 | 3 |
| Polyfunctional monomer (part(s) by weight) |  | 3 | 3 | 3 | 3 |

TABLE 2

|  |  |  | Ex. 1 | Ex. 2 | Comp. Ex. 1 | Comp. Ex. 2 |
|---|---|---|---|---|---|---|
| Material property evaluation | (1) Properties in ordinary state | Hs hardness | 60 | 80 | 60 | 80 |
|  |  | Tensile stress (MPa) | 10.9 | 15.1 | 10.4 | 12.5 |
|  |  | Elongation at break (%) | 350 | 250 | 250 | 150 |
|  | (2) Compression set | (%) | 23 | 22 | 22 | 21 |
|  | (3) Low-temperature elastic recovery test | TR-10 (° C.) | −40 | −40 | −41 | −41 |
|  | (4) Compression set under high/low temperature load | −30° C. (%) | 59 | 66 | 75 | 78 |
|  |  | −40° C. (%) | 67 | 75 | 83 | 91 |
|  | (5) Fuel oil resistance test | Change in volume (A) (%) | 9 | 8 | 8 | 7 |
|  |  | Change in volume (B) (%) | 3 | 2 | 2 | 2 |
| Product evaluation | (1) Low-temperature sealing test | −42° C. | AA | AA | AA | AA |
|  | (2) High/low temperature load sealing test | −38° C. | AA | AA | AA | AA |
|  |  | −40° C. | AA | AA | 1.5 MPa leak | 1.0 MPa leak |
|  |  | −42° C. | AA | AA | leak | leak |

In the low-temperature sealing test having been used in the past, a significant difference could not be found out between the examples and the comparative examples. In the high/low temperature load sealing test, however, it has been confirmed that sealing properties of the examples were superior to those of the conventional ones, and the sealing properties of the examples had correlation with the results of the high/low temperature load compression set test.

INDUSTRIAL APPLICABILITY

As is clear from the above detailed description, the fluororubber-based sealing material of the present invention is excellent in heat resistance, low-temperature resistance and fuel oil resistance and is preferable as a sealing material that is used in such a portion as brought into contact with an automobile fuel. According to the present invention, moreover, there is also provided a composition for a fluororubber-based sealing material, from which such a fluororubber-based sealing material as above is obtained.

| Description of Number | |
|---|---|
| 61: | upper structure part |
| 62: | bolt |
| 63: | backup ring |
| 64: | O-ring |
| 65: | sealing target member |
| 65A: | neck of sealing target member |
| 65B: | neck of sealing target member |
| 66A: | head of sealing target member |
| 66B: | head of sealing target member |

-continued

| Description of Number | |
|---|---|
| 67A: | holding member |
| 67B: | holding member |
| 68: | space |
| 69: | lower structure part |
| 72: | hole |
| 80: | low-temperature sealing property measuring fixture |

The invention claimed is:

1. A fluororubber-based sealing material obtained by crosslinking a composition for a fluororubber-based sealing material, said composition comprising:
   a fluorine-containing copolymer containing 64 to 69% by weight of fluorine, having a crosslinking site derived from a bromine-containing compound and/or an iodine-containing compound and capable of being crosslinked by a peroxide, an organic peroxide in an amount of 0.5 to 6 parts by weight based on 100 parts by weight of the fluorine-containing copolymer, and a polyfunctional monomer in an amount of 1 to 10 parts by weight based on 100 parts by weight of the fluorine-containing copolymer, wherein the fluorine-containing copolymer in the composition for a fluororubber-based sealing material is a fluororubber polymer obtained by copolymerizing the following components (a) to (e):

(a) vinylidene fluoride (VDF) in an amount of 30 to 70% by mol, (b) tetrafluoroethylene (TFE) in an amount of 12 to 30% by mol, (c) perfluoro(methyl vinyl ether) (FMVE) in an amount of 10 to 20% by mol, (d) perfluoro(methoxymethyl vinyl ether) (FMMVE) in an amount of 5 to 30% by mol, and (e) brominated and/or iodinated unsaturated fluorohydrocarbon in amount of 0.01 to 3% by mol based on 100% by mol of the total amount ((a)+(b)+(c)+(d)) of the component (a) to the component (d).

2. The fluororubber-based sealing material as claimed in claim 1, which has TR-10, as determined in the low-temperature elastic recovery test (TR test) defined by JIS K6261 corresponding to ASTM D1329, of −42° C. to −35° C.

3. The fluororubber-based sealing material as claimed in claim 1, which has a compression set under high/low temperature load of less than 80%.

4. The fluororubber-based sealing material as claimed in claim 1 which is used in a portion of a fuel tank, a fuel injector (fuel injection device), a fuel pump or a fuel pipe of an automobile, said portion being brought into contact with a fuel selected from oils, such as a fuel oil, a lubricating oil and a hydraulic oil, aromatic hydrocarbons, aliphatic hydrocarbons, alcohol mixed oils, and alcohols, or a gas of the fuel.

5. The fluororubber-based sealing material as claimed in claim 1 wherein the change in volume of the fluororubber-based sealing material after the fluororubber-based sealing material is immersed in a fuel at room temperature of 20 to 25° C. for 168 hours is not more than 20%.

6. The fluororubber-based sealing material as claimed in claim 5, wherein the fuel is at least one fuel selected from the group consisting of gasoline, liquefied petroleum gas (LPG), compressed natural gas (CNG), gas oil, ethanol, bioethanol and methanol.

* * * * *